United States Patent
Avenatti et al.

(10) Patent No.: US 11,124,057 B2
(45) Date of Patent: Sep. 21, 2021

(54) HYPER-COMPACT ELECTRIC ALL-TERRAIN VEHICLE DRIVETRAIN AND CONVERSION KIT

(71) Applicant: The United States of America, as represented by the Secretary of the Navy, Crane, IN (US)

(72) Inventors: Peter Matthew Avenatti, Bloomington, IN (US); Tyler Allen Mullis, Bloomfield, IN (US); Braden Matthew Yake, Bloomington, IN (US); Jason Everett Miller, Linton, IN (US); Ryan Wynne, Bloomington, IN (US); Lucas Allison, Bloomington, IN (US); Joseph Patrick Bailey, Bloomington, IN (US); Al Bodey, Charlotte, NC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 8 days.

(21) Appl. No.: 16/280,843

(22) Filed: Feb. 20, 2019

(65) Prior Publication Data
US 2019/0366829 A1    Dec. 5, 2019

Related U.S. Application Data
(60) Provisional application No. 62/632,550, filed on Feb. 20, 2018.

(51) Int. Cl.
*B60K 6/40* (2007.10)
*B60K 1/02* (2006.01)
(Continued)

(52) U.S. Cl.
CPC ............ *B60K 6/40* (2013.01); *B60K 1/02* (2013.01); *B60K 6/52* (2013.01); *B60L 50/16* (2019.02);
(Continued)

(58) Field of Classification Search
CPC ...... B60K 2007/0061; B60K 2001/001; B60K 2007/0046; B60K 1/00; B60K 7/0007;
(Continued)

(56) References Cited

U.S. PATENT DOCUMENTS 7,510,199 B2 * 3/2009 Nash ..................... B60K 6/52
280/124.135
10,227,000 B1 * 3/2019 McCoy ............... B60K 17/356
(Continued)

*Primary Examiner* — Justin Holmes
(74) *Attorney, Agent, or Firm* — Naval Surface Warfare Center, Crane Division

(57) ABSTRACT

The present invention relates to electric drivetrain kits for converting all-terrain vehicles into hybrid or electric vehicles. In exemplary embodiments, a conversion kit replaces an existing standard single motor and transmission drive system with a dual set-up including a motor for each rear wheel and a split transmission that houses two sets of gear reduction components in a single housing or an all-wheel configuration with two transmission sets (front and rear). Dual output shafts in each transmission set drive the wheels independently to provide the torque needed as required and demanded by each wheel.

5 Claims, 10 Drawing Sheets

(51) Int. Cl.
*B60K 6/52* (2007.10)
*B60W 20/10* (2016.01)
*B60S 11/00* (2006.01)
*B60L 50/16* (2019.01)

(52) U.S. Cl.
CPC .............. *B60S 11/00* (2013.01); *B60W 20/10* (2013.01); *B60L 2200/46* (2013.01)

(58) Field of Classification Search
CPC ... B60K 6/40; B60K 1/02; B60K 6/52; B60K 6/46; B60K 2001/0438; B60K 1/04; B60Y 2200/20; B60Y 2400/202; B60Y 2304/076; B60Y 2200/46; B60W 20/10; B60S 11/00; B60L 50/16; B60L 2200/46; B60L 50/66; B60L 50/75; B60L 2220/42; Y02T 10/70; Y02T 90/40; Y02T 10/62; Y02T 10/64

See application file for complete search history.

(56) References Cited

U.S. PATENT DOCUMENTS

| | | | |
|---|---|---|---|
| 2012/0103708 A1* | 5/2012 | Hennings | B60K 7/0007 180/65.6 |
| 2014/0284130 A1* | 9/2014 | Knoblauch | B60K 17/356 180/242 |
| 2016/0039277 A1* | 2/2016 | Falls | H02K 16/00 180/62 |
| 2018/0022387 A1* | 1/2018 | Ta | B60K 1/04 180/291 |
| 2018/0023692 A1* | 1/2018 | Gauthier | F16H 59/44 701/55 |
| 2018/0236982 A1* | 8/2018 | Yano | B60K 1/02 |

\* cited by examiner

HYPER-COMPACT ELECTRIC ALL-TERRAIN VEHICLE DRIVETRAIN AND CONVERSION KIT

CROSS-REFERENCE TO RELATED APPLICATIONS

The present application claims priority to U.S. Provisional Patent Application Ser. No. 62/632,550, filed Feb. 20, 2018, entitled "Hyper-Compact Electric All-Terrain Vehicle Drivetrain and Conversion Kit," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,505) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to electric drivetrain kits for converting all-terrain vehicles into hybrid or electric vehicles.

BACKGROUND AND SUMMARY OF THE INVENTION

The present invention relates to electric drivetrain kits for converting all-terrain vehicles into hybrid or electric vehicles. Previous all-terrain vehicles (ATVs) are limited by space constraints within the chassis of the ATV.

Embodiments of the invention relate to a silent all-terrain vehicle (ATV) drive system which allows for more efficient power transfer and steady torque by reducing the "fight" between the wheels speed and any slippage that occurs. The system is quieter and cooler making thermal and audio detection less likely and improves working conditions for the driver. Regenerative breaking capability reduces wear on braking components. Gear ratios are adjustable to allow for customization based on terrain and conditions and gears can be changed relatively easily. The system also allows for potential zero-radius turning and is submersible.

According to an illustrative embodiment of the present disclosure, a conversion kit replaces an existing standard single motor and transmission drive system with a dual set-up including a motor for each rear wheel and a split transmission that houses two sets of gear reduction components in a single housing or an all-wheel configuration with two transmission sets (front and rear). Dual output shafts drive the wheels independently. The transmission housing can be opened and gears replaced via pull and drop.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
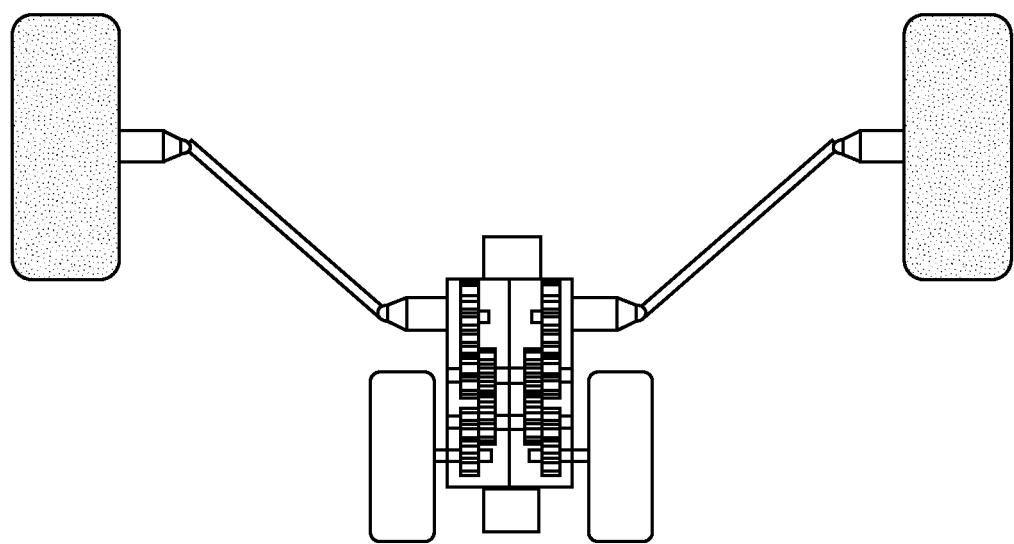
FIG. 1 shows an exemplary power train architecture.
Figure 1:
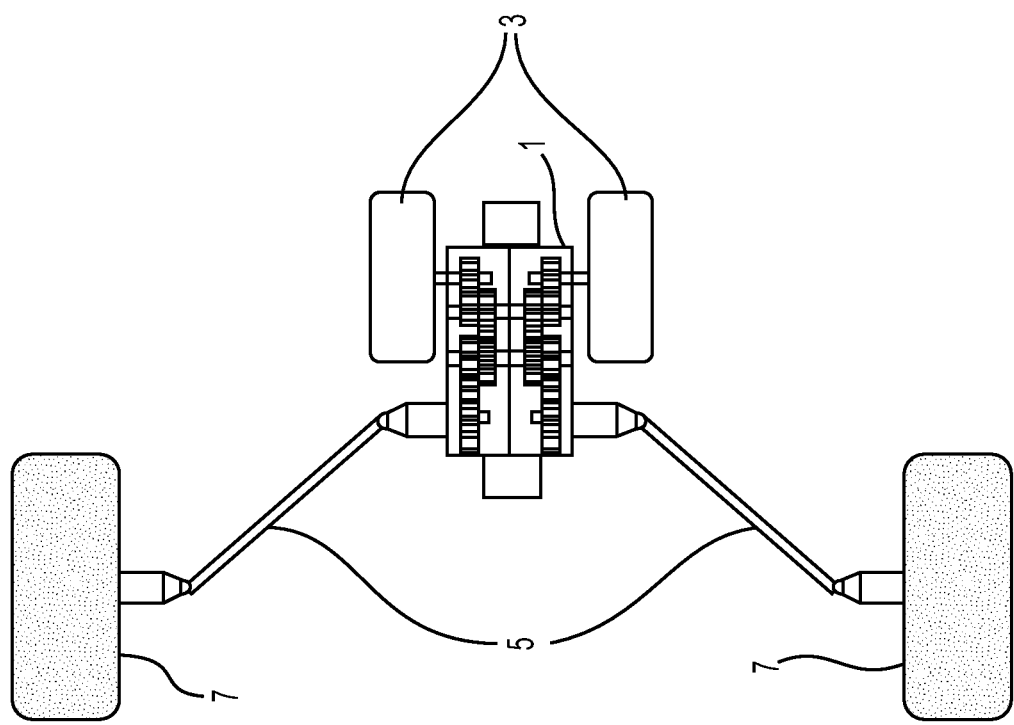

FIG. 1 shows an exemplary power train architecture. A compact, independent transmission 1 can be coupled to one to two traction motors 3 and to axles 5. In embodiments with two traction motors 3 coupled to each transmission 1, each traction motor 3 powers a corresponding wheel 7. In embodiments with one traction motor 3 coupled to each transmission 1, each traction motor 3 powers two corresponding wheels (e.g., a pair of front or rear wheels). Each motor 3 has a motor controller which adjusts the output of its motor.

Figure 2:
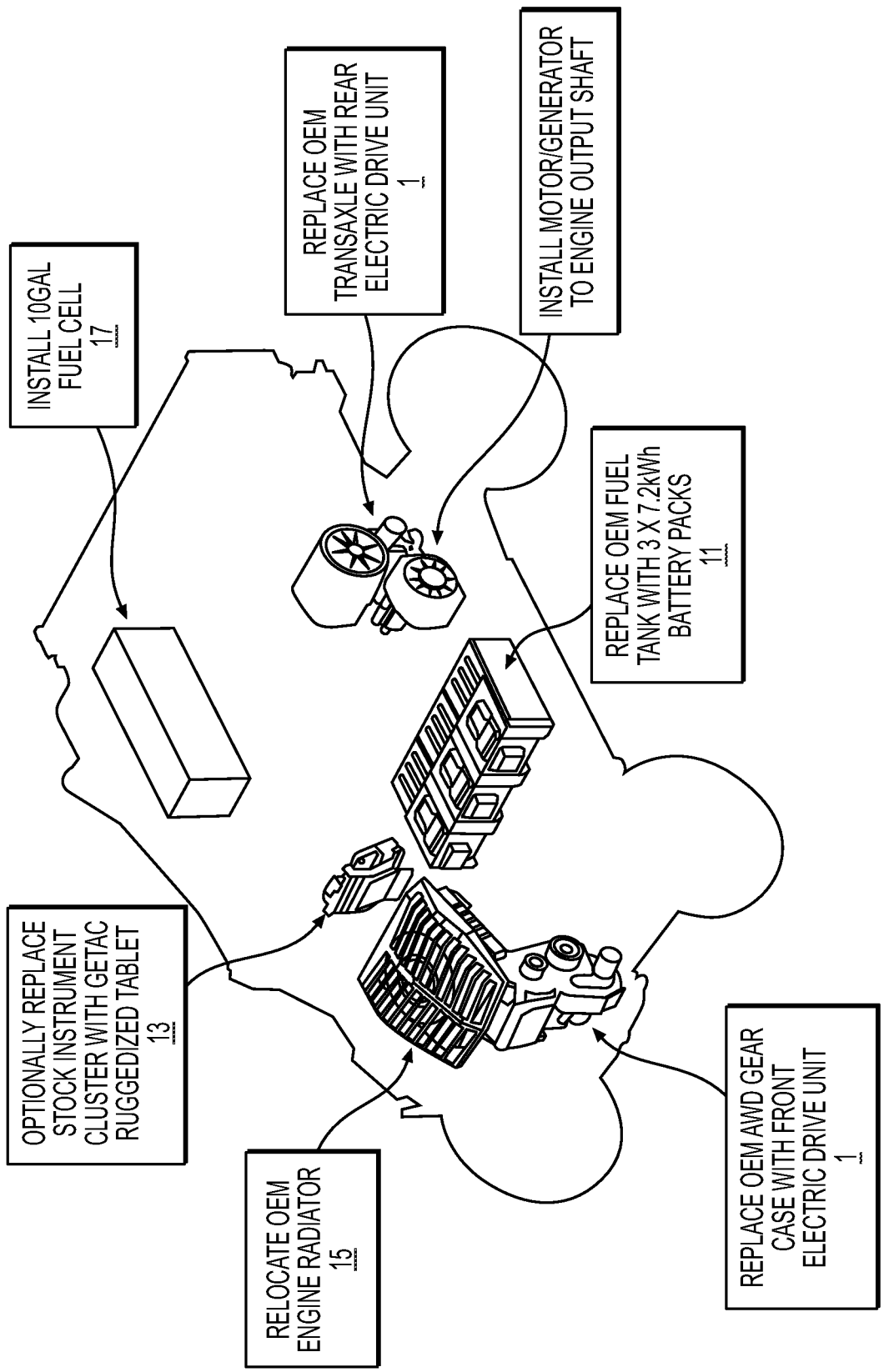
FIG. 2 shows an exemplary ATV with conversion kit components installed.

FIG. 2 shows an exemplary ATV with conversion kit components installed. A conversion kit can include two transmissions 1 and at least one battery pack 11 to act as a power source, and an Electronic Control Unit (ECU) 13. A fuel cell 17 can be installed as an additional power source. An engine radiator 15 can be removed or relocated depending on the configuration of the motors. For example, if a gasoline engine is used as one of the motors, radiator 15 can be relocated to a position to provide optimal cooling to that engine. ECU 13 can be a ruggedized tablet mounted on or near the dashboard or steering column to provide a driver or passenger access to electronic controls. Each of the motor controllers, batteries and subsystems are electrically coupled to an ECU 13 (see FIG. 5B) via CANBUS and digital inputs/outputs. Individual motor controllers allow the wheels to move independently and provide the torque needed as required and demanded by each.

Figure 3:
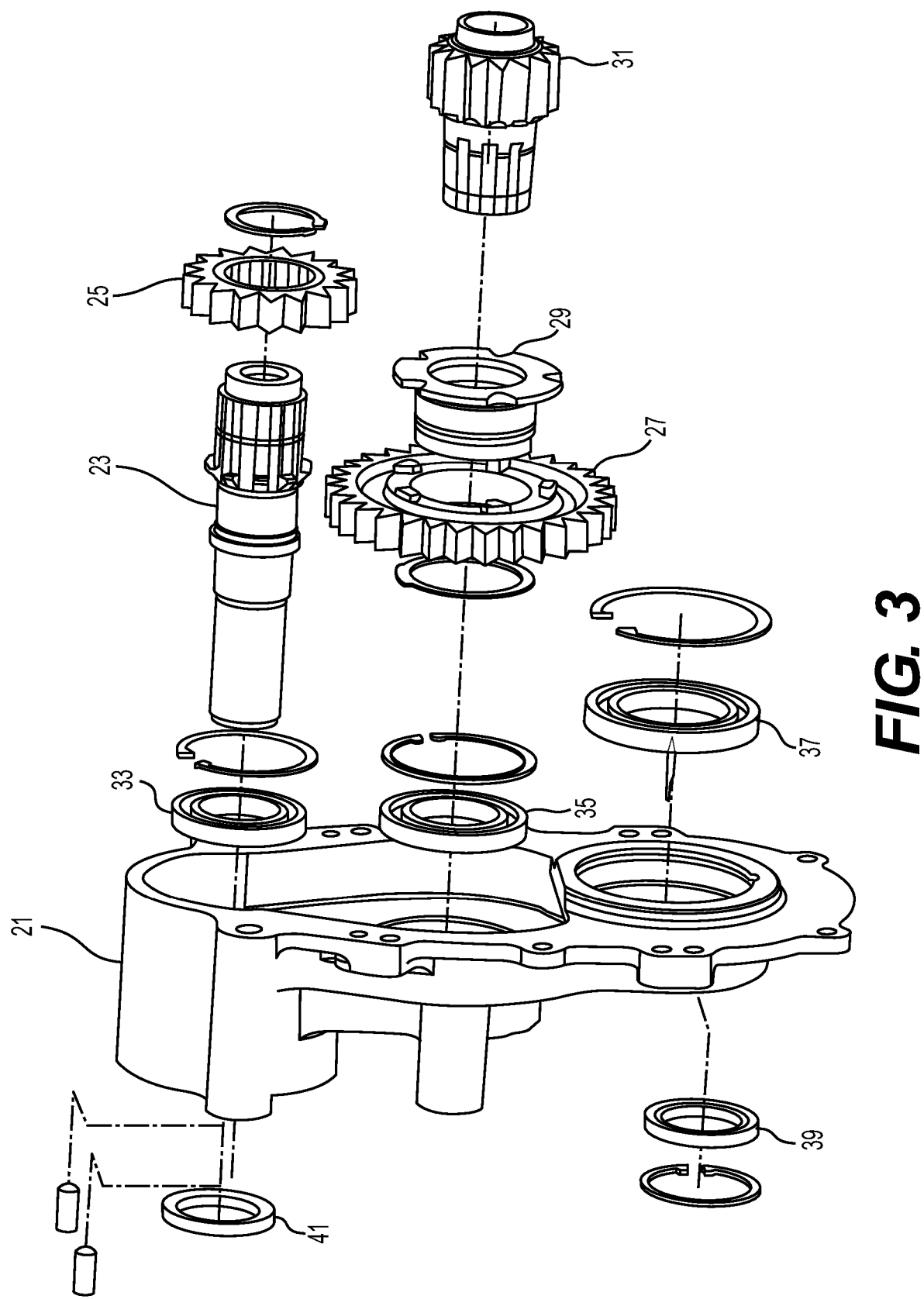
FIG. 3 shows a first portion of an exemplary transmission.

FIG. 3 shows a first portion of an exemplary transmission. A first outboard cover 21 covers the components. An input shaft 23 connects a motor to a first pinion 25. A shaft coupler 29 connects a first gear 27 to a second pinion 31. A first, second, and third bearing 33, 35, 37 permit rotation in one direction. A plurality of seals including seals 39, 41 are used to facilitate coupling of the other components. A third portion of an exemplary transmission can be a mirrored first portion such that the first, second (see FIG. 4), and third portions form a symmetrical transmission.

Figure 4:
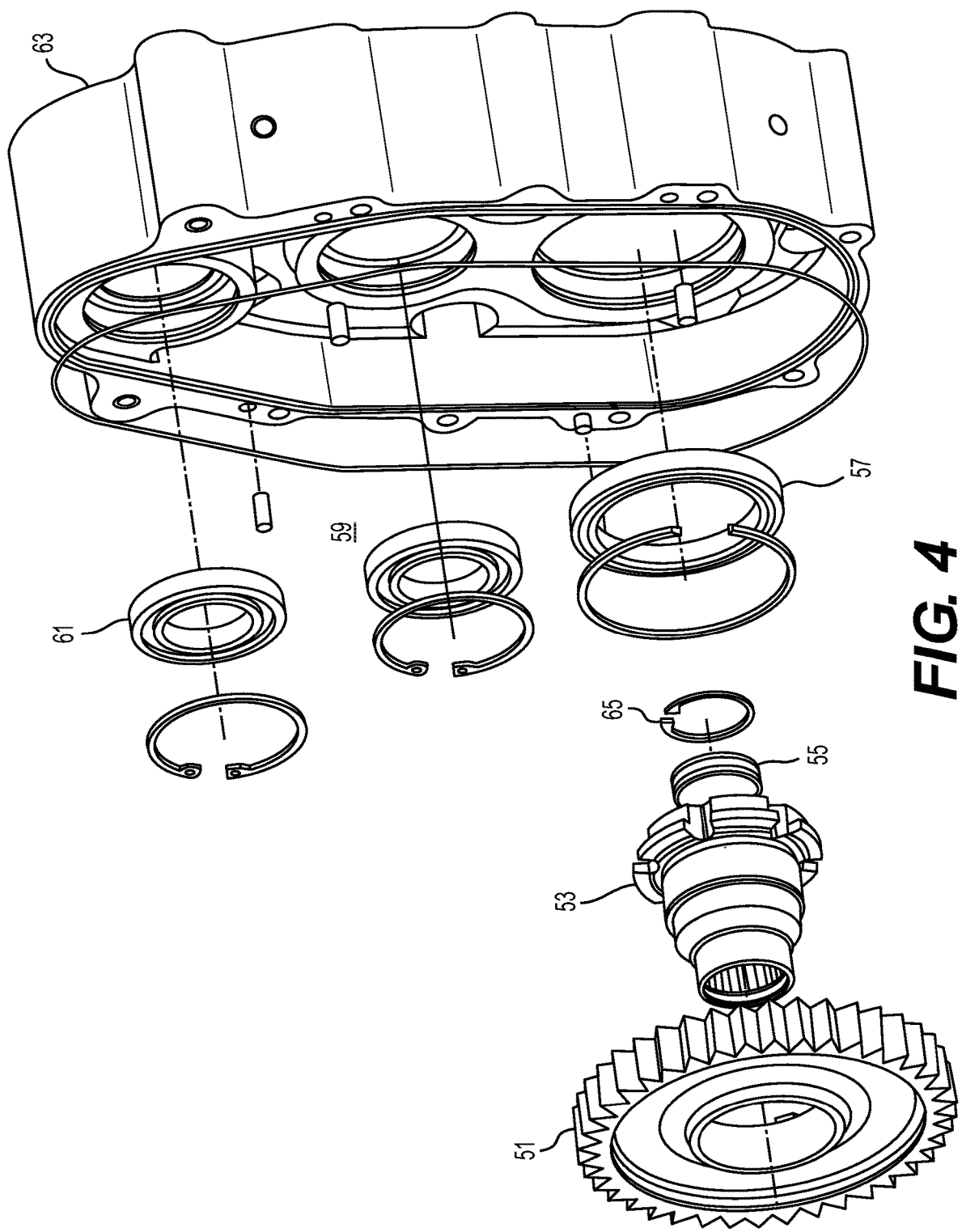
FIG. 4 shows a second portion of an exemplary transmission.

FIG. 4 shows a second portion of an exemplary transmission. An output shaft 53 couples to a second gear 51 and shaft plug 55. A fourth, fifth, and sixth bearing 57, 59, 61 permit rotation in one direction. A first pinion (see FIG. 3) couples to sixth bearing 61. A second pinion (see FIG. 3)

couples to fifth bearing 59. Second gear 51 couples to third bearing (see FIG. 3). A plurality of seals including seals are used to facilitate coupling of the other components. A retain ring 65 holds shaft plug 55 in place. The common center housing 63 is symmetrical with matching pairs of components (e.g., 51, 53, 55, 57, 59, 61) such that the first (see FIG. 3), second, and third portions (see FIG. 3) form a symmetrical transmission. The gears and pinions in FIGS. 3 and 4 can be swapped out between use to adjust the gear ratios to change the performance of the vehicle (e.g., using smaller output gears on rough terrain).

Figure 5A:
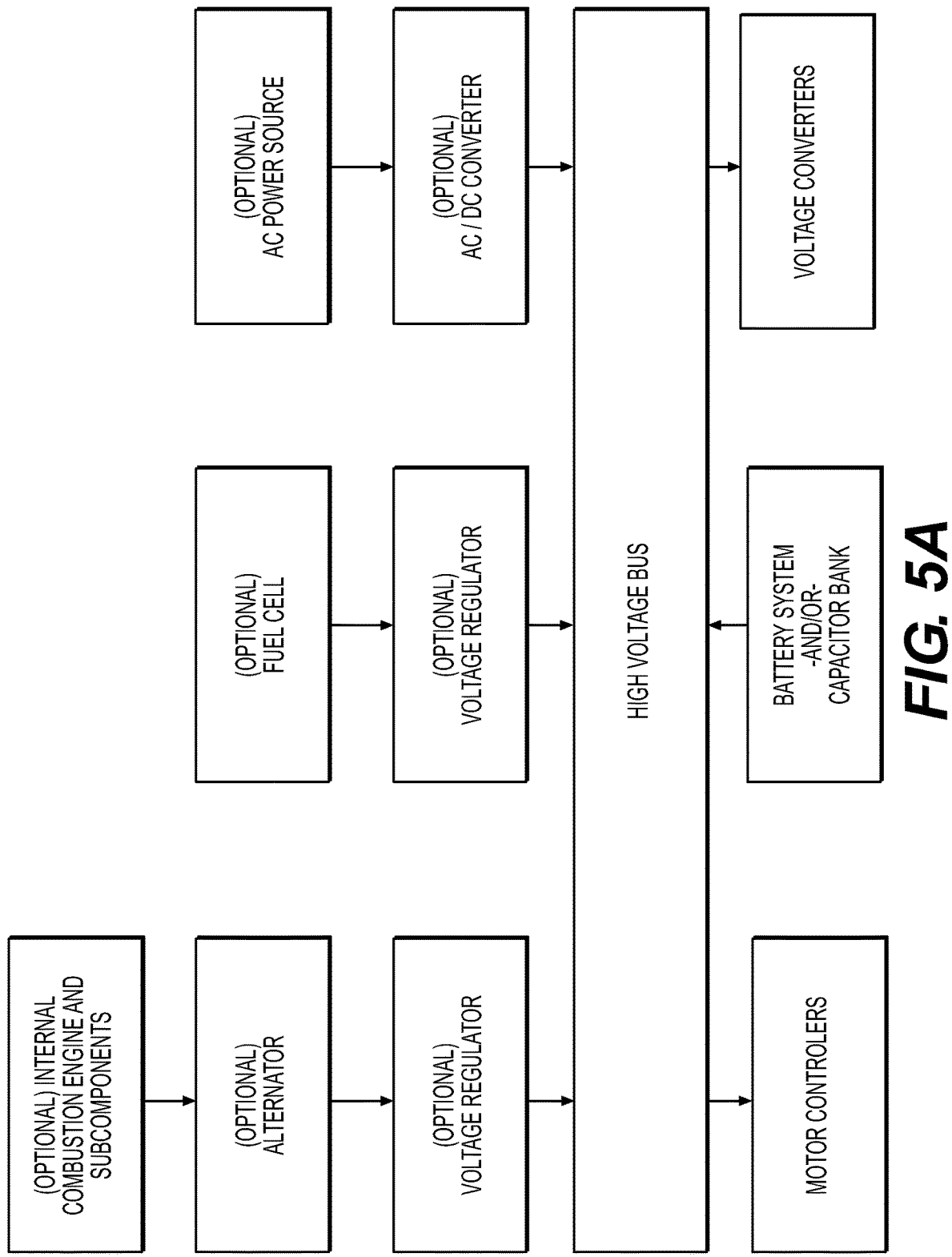
FIGS. 5A and 5B show an exemplary vehicle power architecture.
Figure 5B:
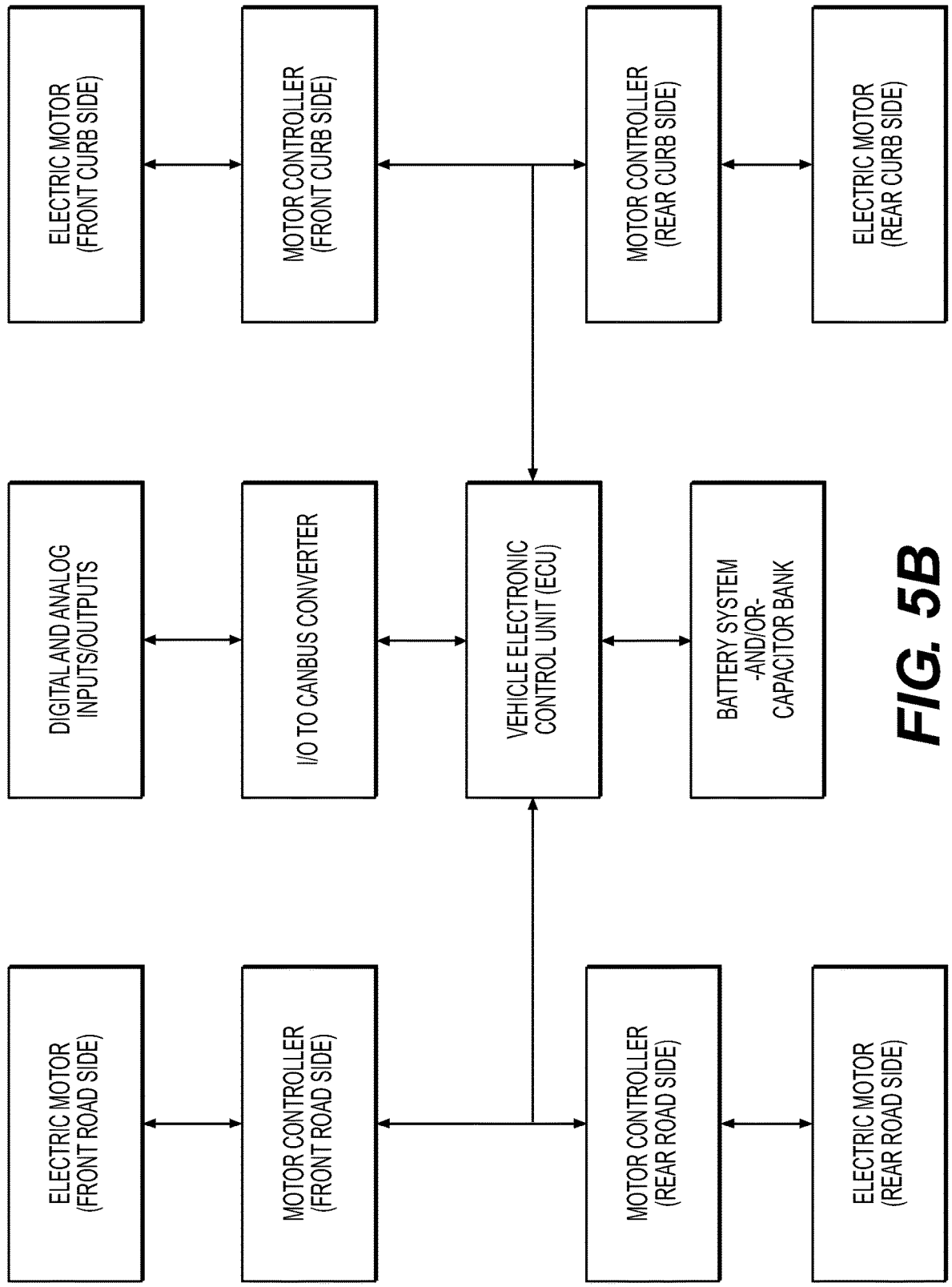

FIGS. 5A and 5B show an exemplary vehicle power architecture. FIG. 5A shows electrical components present in hybrid and pure electric embodiments as well as combustion components present only in hybrid embodiments. In FIG. 5B, the ECU comprises an interface card which contains the connectors to tie the board to the system and transceivers to convert serial and CANBUS signals, a breakout board/card that allows a commercial development board to connect to the ECU, an I/O card that includes filters and I/O expanders to allow for the appropriate amount of I/O and protection from electronic noise, and a power card that converts vehicle voltages to appropriate voltages needed by the ECU. By using a separate motor and motor controller for each wheel assembly, exemplary embodiments are capable of exercising improved control and turning capabilities by individually adjusting the power to each motor. Exemplary embodiments are capable of "zero-turns," wherein the vehicle is capable of rotating about an approximate center with minimal movement of the approximate center's position.

Figure 6A:
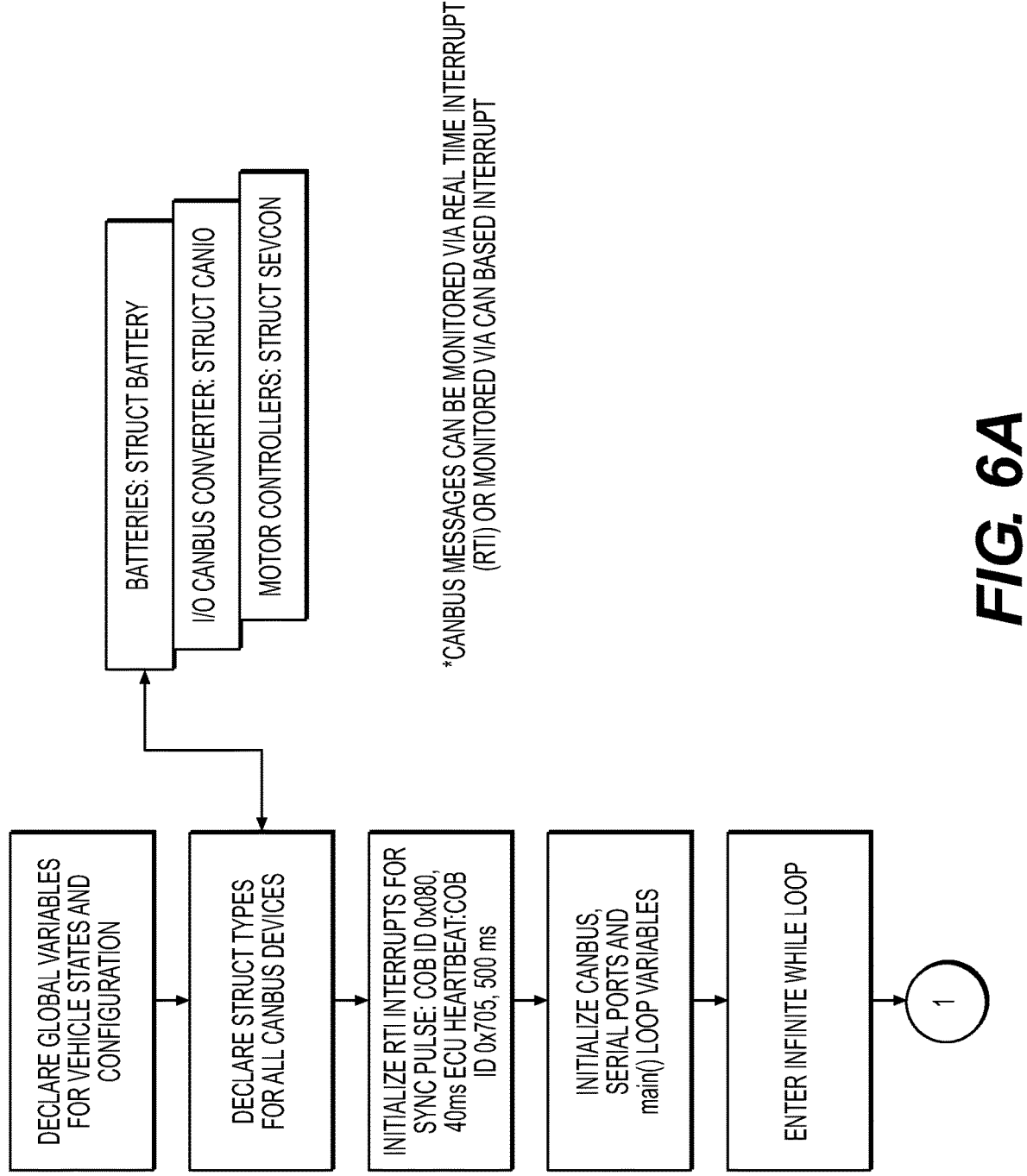
FIGS. 6A and 6B show an exemplary software block diagram for vehicle startup.
Figure 6B:
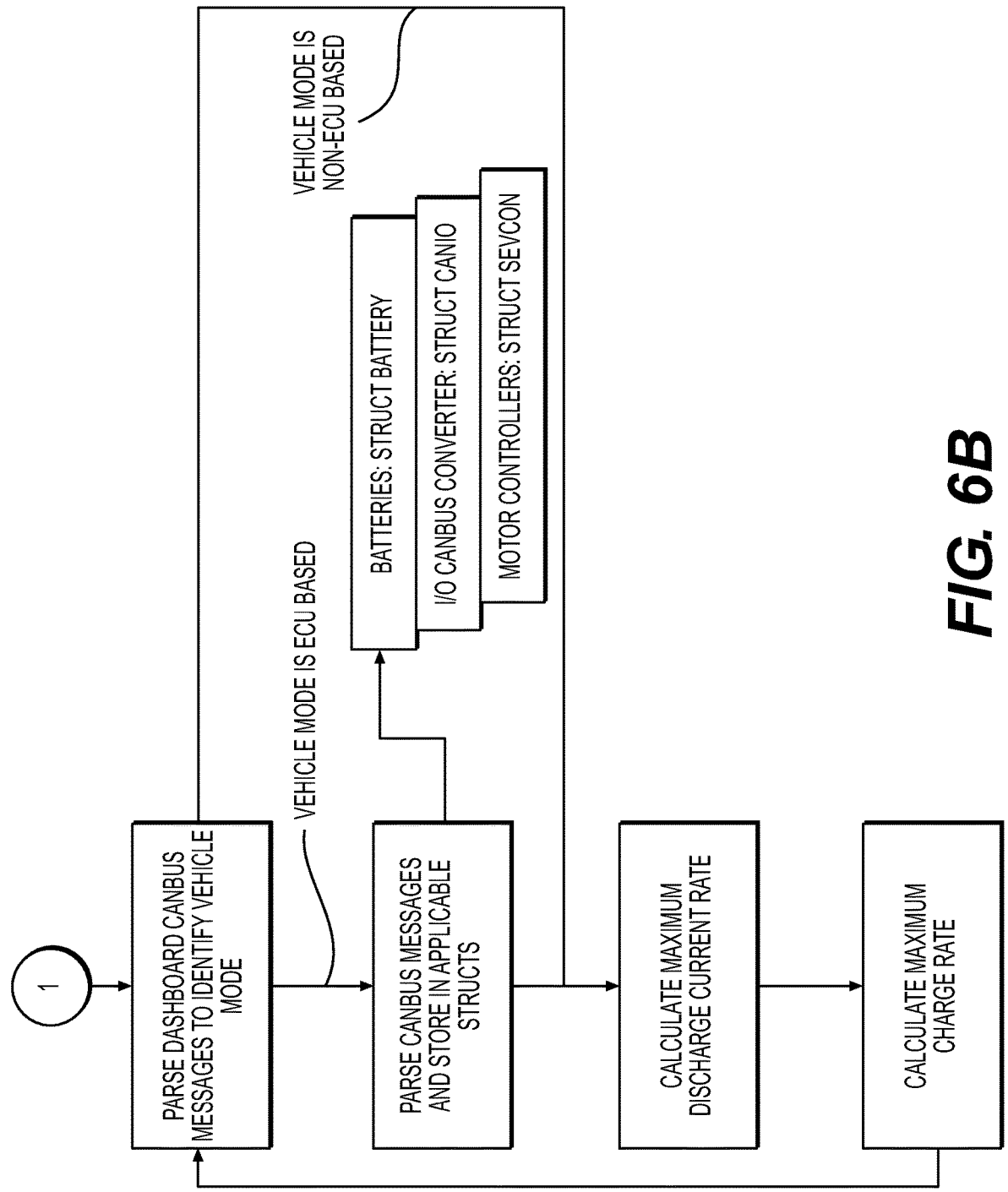

FIGS. 6A and 6B show an exemplary software block diagram for vehicle startup.

Figure 7:
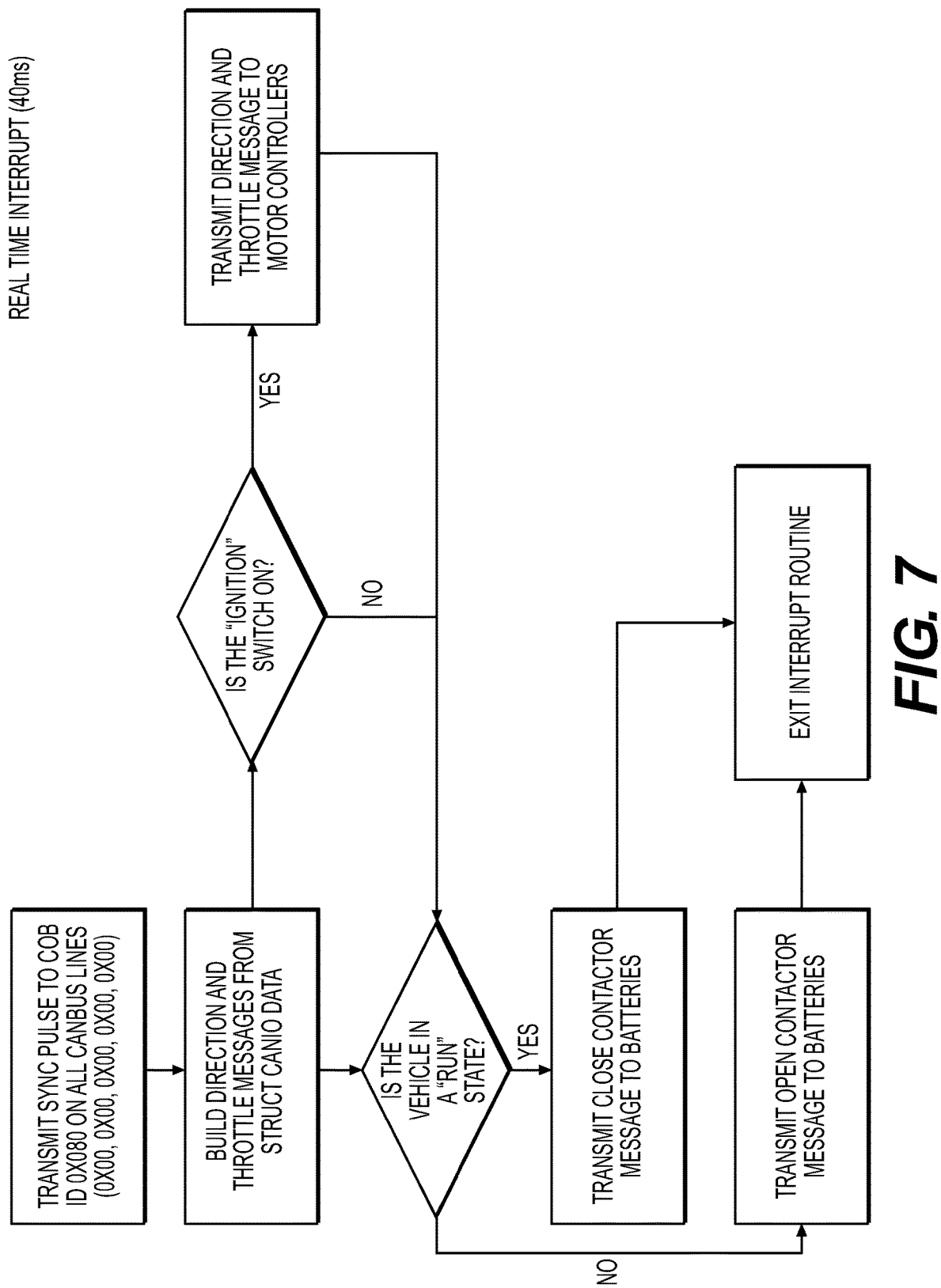
FIG. 7 shows an exemplary software block diagram for vehicle shutdown.

FIG. 7 shows an exemplary software block diagram for vehicle shutdown.

Figure 8:
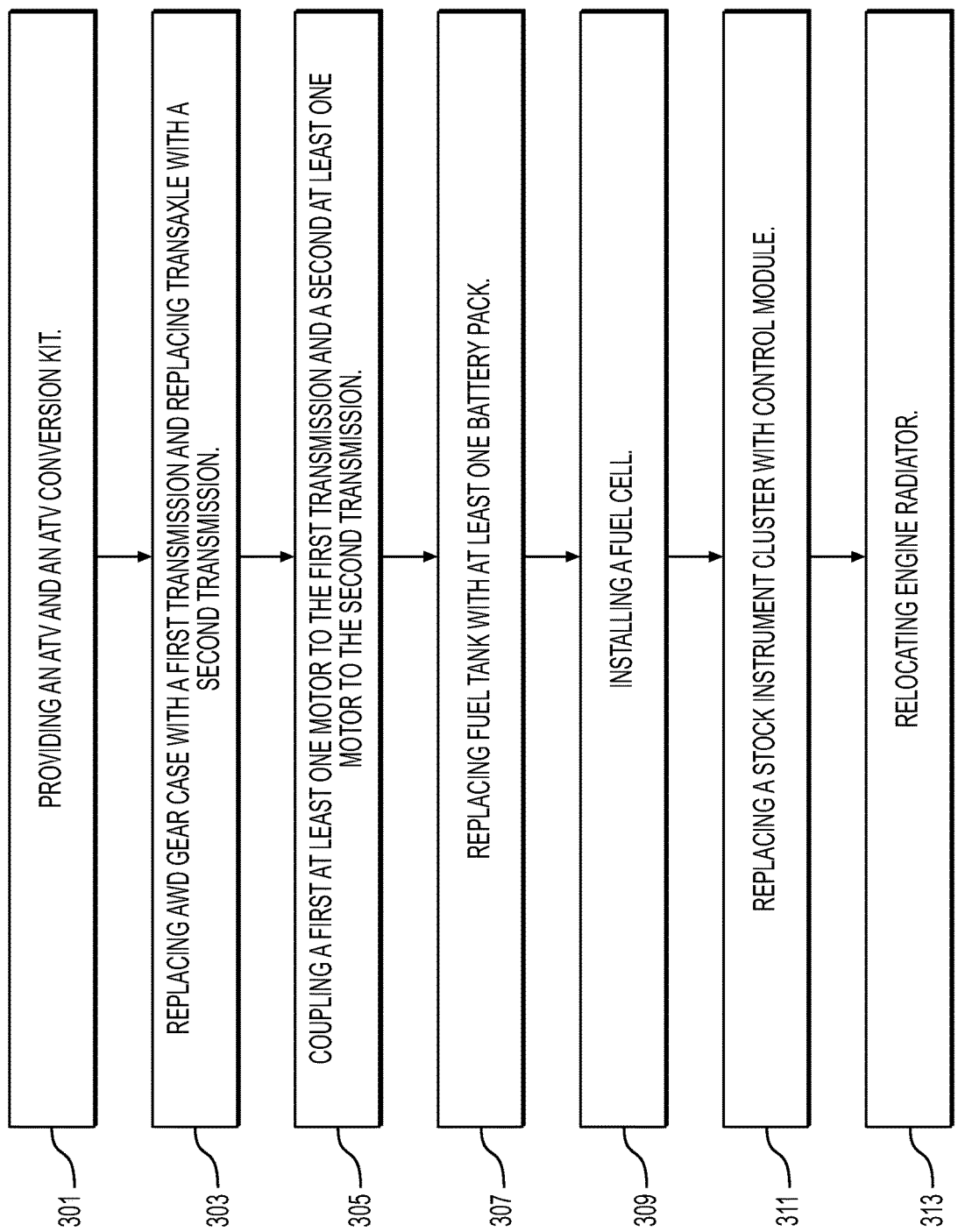
FIG. 8 shows an exemplary method of converting ATVs.

FIG. 8 shows an exemplary method of converting ATVs from gas powered to hybrid or pure electric powered. At step 301: providing an ATV and an ATV conversion kit. At step 303: replacing AWD gear case with a first transmission and replacing transaxle with a second transmission. At step 305: coupling a first at least one motor to the first transmission and a second at least one motor to the second transmission. At step 307: replacing fuel tank with at least one battery pack. At step 309: installing a fuel cell. At step 311: replacing a stock instrument cluster with control module. At step 313: relocating engine radiator.

Although the invention has been described in detail with reference to certain preferred embodiments, variations and modifications exist within the spirit and scope of the invention as described and defined in the following claims.

The invention claimed is:

1. A transmission comprising:
   a first and a second outboard cover;
   a common center housing;
   a first and a second input shaft, wherein the first input shaft is disposed between the first outboard cover and common center housing, wherein the second input shaft is disposed between the second outboard cover and common center housing;
   a first and a second pinion, wherein the first and the second pinion couple to first and second input shaft, respectively;
   a first and a second gear, wherein the first and the second gear engage with the first and the second pinion, respectively;
   a third and a fourth pinion, wherein the third and the fourth pinion are coupled to the first and the second gear, respectively;
   a third and a fourth gear, wherein the third and the fourth gear engage with the third and the fourth pinion, respectively; and
   a first and a second output shaft coupled to the third and the fourth gear, respectively, wherein the first output shaft is disposed between the first outboard cover and common center housing, wherein the second output shaft is disposed between the second outboard cover and common center housing;
   wherein when a first motor is coupled to the first input shaft, the first motor controls the rotation of the first output shaft;
   wherein when a second motor is coupled to the second input shaft, the second motor controls the rotation of the second output shaft.

2. A vehicle drivetrain conversion kit comprising:
   a first transmission comprising a first input shaft, a second input shaft, a first output shaft, and a second output shaft, wherein the first transmission is configured to replace an original transmission such that the first output shaft is connected to a first wheel assembly and the second output shaft is connected to a second wheel assembly;
   at least one power source;
   an electronic control unit (ECU);
   wherein the ECU is configured to control the rotation of the first wheel assembly and the second wheel assembly.

3. The conversion kit of claim 2, further comprising:
   a second transmission comprising a third input shaft, a fourth input shaft, a third output shaft, and a fourth output shaft, wherein the second transmission is configured to replace a rear transaxle such that the third output shaft is connected to a third wheel assembly and the fourth output shaft is connected to a fourth wheel assembly;
   wherein the ECU is further configured to control the rotation of the third wheel assembly and the fourth wheel assembly.

4. The conversion kit of claim 3, further comprising:
   a tablet comprising an ECU user interface configured to control the ECU.

5. The conversion kit of claim 3,
   the first transmission further comprising:
   a first and a second outboard cover;
   a first common center housing;
   wherein the first input shaft is disposed between the first outboard cover and common center housing, wherein the second input shaft is disposed between the second outboard cover and the first common center housing;
   a first and a second pinion, wherein the first and the second pinion couple to first and second input shaft, respectively;
   a first and a second gear, wherein the first and the second gear engage with the first and the second pinion, respectively;
   a third and a fourth pinion, wherein the third and the fourth pinion are coupled to the first and the second gear, respectively; and
   a third and a fourth gear, wherein the third and the fourth gear engage with the third and the fourth pinion, respectively;

wherein the first and the second output shaft are coupled to the third and the fourth gear, respectively, wherein the first output shaft is disposed between the first outboard cover and the first common center housing, wherein the second output shaft is disposed between the second outboard cover and the first common center housing;

wherein when a first motor is coupled to the first input shaft, the first motor controls the rotation of the first output shaft;

wherein when a second motor is coupled to the second input shaft, the second motor controls the rotation of the second output shaft;

the second transmission further comprising:

a third and a fourth outboard cover;

a second common center housing;

wherein the third input shaft is disposed between the third outboard cover and the second common center housing, wherein the fourth input shaft is disposed between the fourth outboard cover and the second common center housing;

a fifth and a sixth pinion, wherein the fifth and the sixth pinion couple to third and fourth input shaft, respectively;

a fifth and a sixth gear, wherein the fifth and the sixth gear engage with the fifth and sixth pinion, respectively;

a seventh and an eighth pinion, wherein the seventh and the eighth pinion are coupled to the fifth and the sixth gear, respectively; and a seventh and an eighth gear, wherein the seventh and the eighth gear engage with the seventh and the eighth pinion, respectively;

wherein the third and the fourth output shaft are coupled to the seventh and the eighth gear, respectively, wherein the third output shaft is disposed between the third outboard cover and second common center housing, wherein the fourth output shaft is disposed between the fourth outboard cover and second common center housing;

wherein when a third motor is coupled to the third input shaft, the third motor controls the rotation of the third output shaft;

wherein when a fourth motor is coupled to the fourth input shaft, the fourth motor controls the rotation of the fourth output shaft.

* * * * *